(12) United States Patent
Takahashi

(10) Patent No.: US 8,800,284 B2
(45) Date of Patent: Aug. 12, 2014

(54) SHAPE MEMORY ALLOY ACTUATOR

(71) Applicant: Olympus Corporation, Tokyo (JP)

(72) Inventor: Masaya Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/783,245

(22) Filed: Mar. 2, 2013

(65) Prior Publication Data

US 2013/0174542 A1    Jul. 11, 2013

Related U.S. Application Data

(63) Continuation of application No. PCT/JP2011/069512, filed on Aug. 30, 2011.

(30) Foreign Application Priority Data

Sep. 2, 2010   (JP) ................................ 2010-196846

(51) Int. Cl.
F03G 7/06     (2006.01)

(52) U.S. Cl.
CPC .................................... F03G 7/065 (2013.01)
USPC ......................................................... 60/528

(58) Field of Classification Search
CPC   F03G 7/065; A61B 1/00002; A61B 1/00071;
A61B 1/0011; A61B 1/00133; A61B 1/0051;
A61B 1/0052; A61B 1/0053; A61B 1/0057;
A61B 5/15115; A61B 5/15119
USPC ..................................... 60/527–529; 385/117
See application file for complete search history.

(56) References Cited

U.S. PATENT DOCUMENTS

| | | | |
|---|---|---|---|
| 4,932,210 A * | 6/1990 | Julien et al. ...................... 60/527 |
| 2006/0207250 A1* | 9/2006 | Komori et al. .................. 60/527 |
| 2007/0100209 A1* | 5/2007 | Takahashi ...................... 600/167 |
| 2009/0013684 A1 | 1/2009 | Takahashi | |
| 2009/0302708 A1 | 12/2009 | Takahashi | |

FOREIGN PATENT DOCUMENTS

| | | |
|---|---|---|
| JP | 64-012077 | 1/1989 |
| JP | 5-87677 | 12/1993 |
| JP | 2003-184732 | 7/2003 |
| JP | 2009-019517 | 1/2009 |

(Continued)

OTHER PUBLICATIONS

International Search Report dated Oct. 11, 2011 issued in PCT/JP2011/069512.

(Continued)

*Primary Examiner* — Thomas Denion
*Assistant Examiner* — Mickey France
(74) *Attorney, Agent, or Firm* — Scully, Scott, Murphy & Presser, P.C.

(57) ABSTRACT

A shape memory alloy actuator includes a wire portion which is inserted through a first tube member, a shape memory alloy wire portion which is inserted through a second tube member, a movable body which is movable in a direction in which, a length of the shape memory alloy wire portion changes, an elastic member which exerts an external force in a direction in which, the shape memory alloy wire portion elongates, and a fixing member to which, one end of the second tube member and one end of the shape memory alloy wire portion are fixed, and one end of the wire portion is connected to the movable body, and one end of the shape memory alloy wire portion and one end of the wire portion are joined to a joining portion, and the joining portion includes a plurality of crimp terminals.

4 Claims, 3 Drawing Sheets

(56) References Cited

FOREIGN PATENT DOCUMENTS

| | | |
|---|---|---|
| JP | 2009-299487 | 12/2009 |
| JP | 2010-025079 | 2/2010 |
| JP | 2011-047278 | 3/2011 |
| WO | WO 2011/024588 A1 | 3/2011 |

OTHER PUBLICATIONS

English Abstract of Japanese Patent Publication No. JP 61-019980, dated Jan. 28, 1986 (corresponding to JP 5-87677).
International Preliminary Report on Patentability together with the Written Opinion dated Apr. 18, 2013 in related International Application No. PCT/JP2011/069512.

* cited by examiner

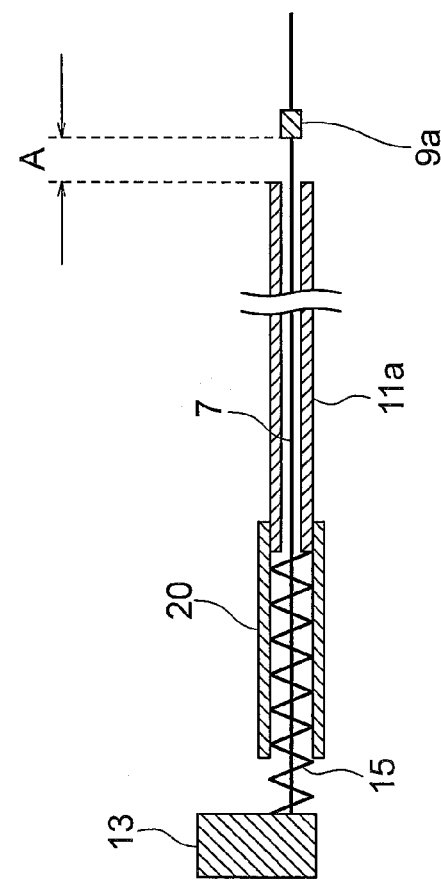
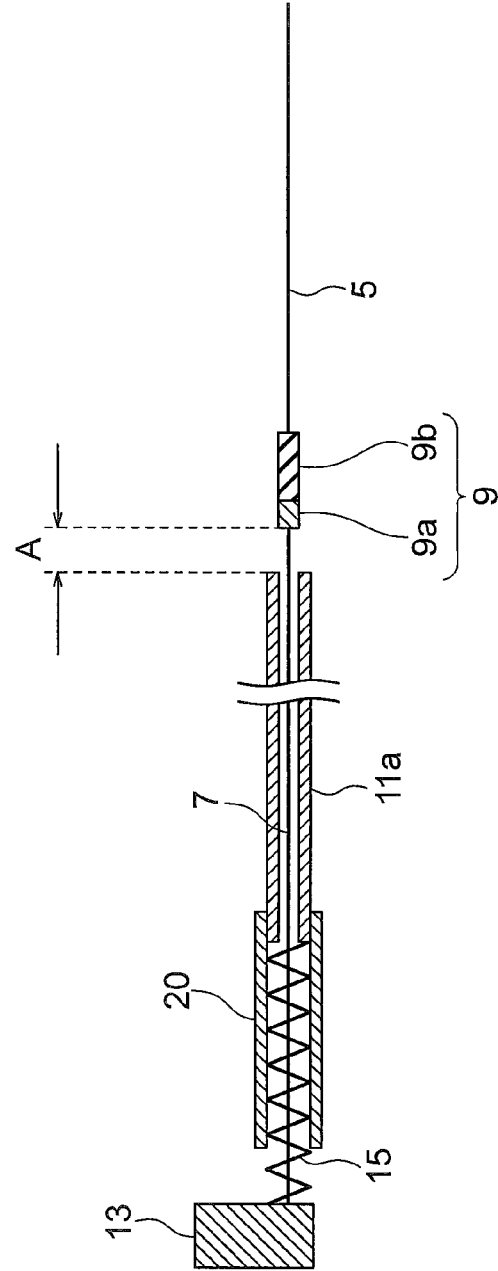

SHAPE MEMORY ALLOY ACTUATOR

CROSS-REFERENCE TO RELATED APPLICATIONS

The present application is based upon and claims the benefit of priority from the prior Japanese Patent Application No. 2010-196846 filed on Sep. 2, 2010; the entire contents of which are incorporated herein by reference.

BACKGROUND OF THE INVENTION

1. Technical Field

The present invention relates to a shape memory alloy actuator.

2. Description of Related Art

Shape memory alloy actuators which include a shape memory alloy have hitherto been used.

In a shape memory alloy, there are two states namely, an austenitic phase and a martensitic phase, and when a temperature is low, the state changes to the martensitic phase, and when the temperature is high, the state changes to the austenitic phase. Moreover, particularly at the time of transition (a reverse transformation) from the martensitic phase to the austenitic phase, a large distortion-restoring force is generated due to a small temperature difference. An actuator in which, a shape change of this shape memory alloy is used has superior characteristics from a view point of small-sizing and making light the weight of the actuator.

For instance, in Patent Document 1, a conventional shape memory alloy actuator has been described.

FIG. 3 is a partial cross-sectional front view of a conventional shape memory alloy actuator 101. The shape memory alloy actuator 101 has an arrangement in which, one end of a wire material of a shape memory alloy 12 is let to be a fixed end 12a, and the other end of the shape memory alloy 12 is let to be a movable end 12b, and the movable end 12b is driven by a stress due to a bias spring 21 and a contraction force which is generated when a length of the wire material of the shape memory alloy 12 has changed by a change in temperature due to heating by applying an electric current to the wire material of the shape memory alloy 12. Moreover, saving of space of the shape memory alloy actuator 101 has been made possible by covering the wire material of the shape memory alloy toward the fixed end 12a, by a tube member 11 which has an insulating property and which can be bent.

In the shape memory alloy actuator 101, an amount of distortion is controlled by the change in temperature of the shape memory alloy 12 due to heating by applying an electric current. As a method for controlling, a method of controlling an amount of heating by applying an electric current by feeding back a resistance value of the shape memory alloy 12 is available.

CITATION LIST

Patent Documents

Patent Document 1: Japanese Patent Publication after Examination Hei 5-87677

SUMMARY OF THE INVENTION

Technical Problem

However, in the conventional shape memory alloy actuator 101, structurally, the shape memory alloy 12 has a portion 12c which is exposed without being covered by the tube member 11.

The temperature of the exposed portion 12c of the shape memory alloy 12 being susceptible to increase, a further improvement is necessary for improving controllability of the amount of distortion, or for achieving low electric power consumption by suppressing the amount of heat required for deformation, to be the minimum.

The present invention has been made in view of the abovementioned circumstances, and an object of the present invention is to provide a shape memory alloy actuator which has an arrangement for further improvement in the controllability, and achievement of lower electric power consumption.

Solution to Problem

To solve the abovementioned issues and to achieve the object, a shape memory alloy actuator according to the present invention includes a wire portion which is inserted through a first tube member, and of which, a deformation in a longitudinal direction is less, a shape memory alloy wire portion which is inserted through a second tube member, and which contracts due to heating by passing an electric current, and of which, a length changes by being elongated due to cooling, a movable body which is movable in a direction in which, the length of the shape memory alloy wire portion changes, an elastic member which exerts an external force in a direction in which, the shape memory alloy wire portion elongates, and a fixing member to which, one end of the second tube member and one end of the shape memory alloy wire portion are fixed, and one end of the wire portion is connected to the movable body, and one end of the shape memory alloy wire portion and one end of the wire portion are joined by a joining portion, and the joining portion includes a plurality of crimp terminals.

In the present invention, it is possible to insert the joining portion through a pipe member having an inner diameter larger than an outer diameter of the first tube member and an outer diameter of the second tube member.

In the present invention, it is possible to let the joining portion have a first crimp terminal and a second crimp terminal, and to let the first crimp terminal have a hardness which is smaller as compared to a hardness of the second crimp terminal, and crimp only the wire portion.

In the present invention it is possible to let the second crimp terminal crimp the shape memory alloy wire portion and the wire portion.

Advantageous Effects of the Invention

In the shape memory alloy actuator according to the present invention, since the shape memory alloy wire portion is not exposed to an outside environment, the shape memory alloy actuator shows an effect that it is possible to make uniform a temperature change of the overall shape memory alloy wire portion and to improve controllability of an amount of distortion. Moreover, in the shape memory alloy actuator according to the present invention, since it is possible to suppress an amount of heat which is required for deformation of the shape memory alloy wire portion, the shape memory alloy actuator shows an effect that it is possible to reduce electric power consumption.

BRIEF DESCRIPTION OF THE DRAWINGS

FIG. 2A is a diagram for explaining a first crimp terminal (component for positioning) of a joining portion of the shape memory alloy actuator according to the embodiment, and FIG. 2B is a diagram for explaining the first crimp terminal and a second crimp terminal (component for joining) of the joining portion.

DETAILED DESCRIPTION OF THE INVENTION

An embodiment according to the present invention will be described below in detail by referring to the accompanying diagrams. However, the present invention is not restricted to the embodiment described below.

Figure 1:
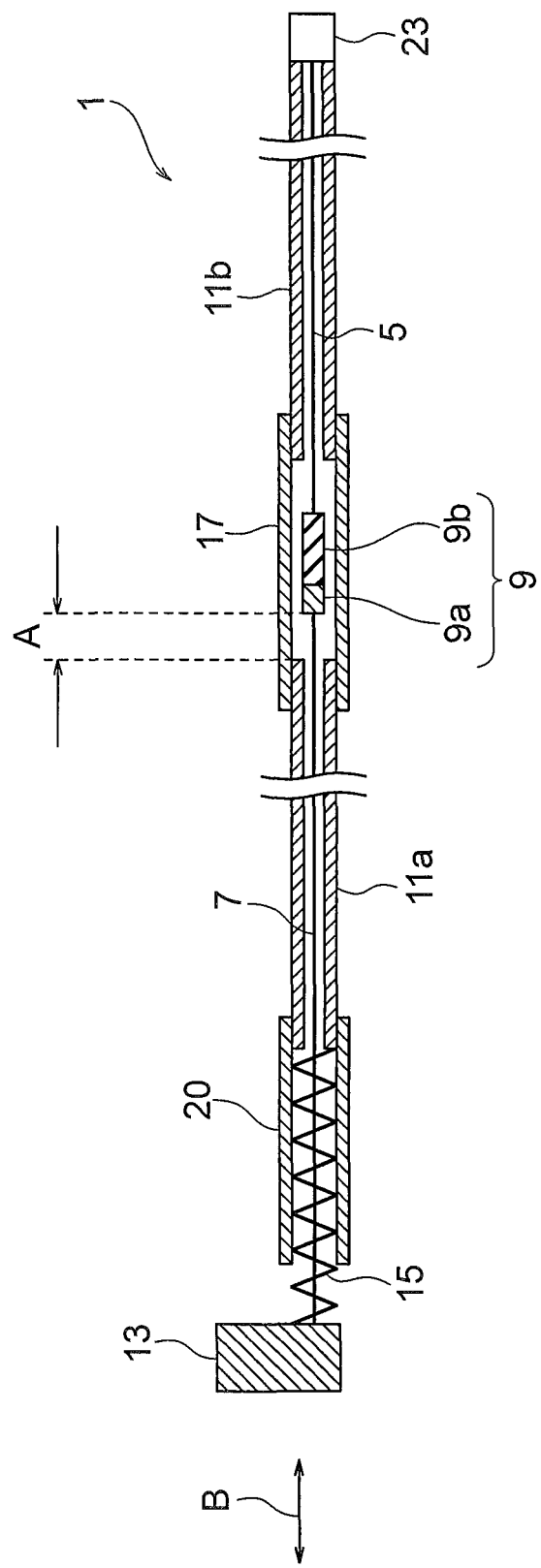
FIG. 1 is a cross-sectional view showing schematically an overall structure of a shape memory alloy actuator according to an embodiment of the present invention.
Figure 3:
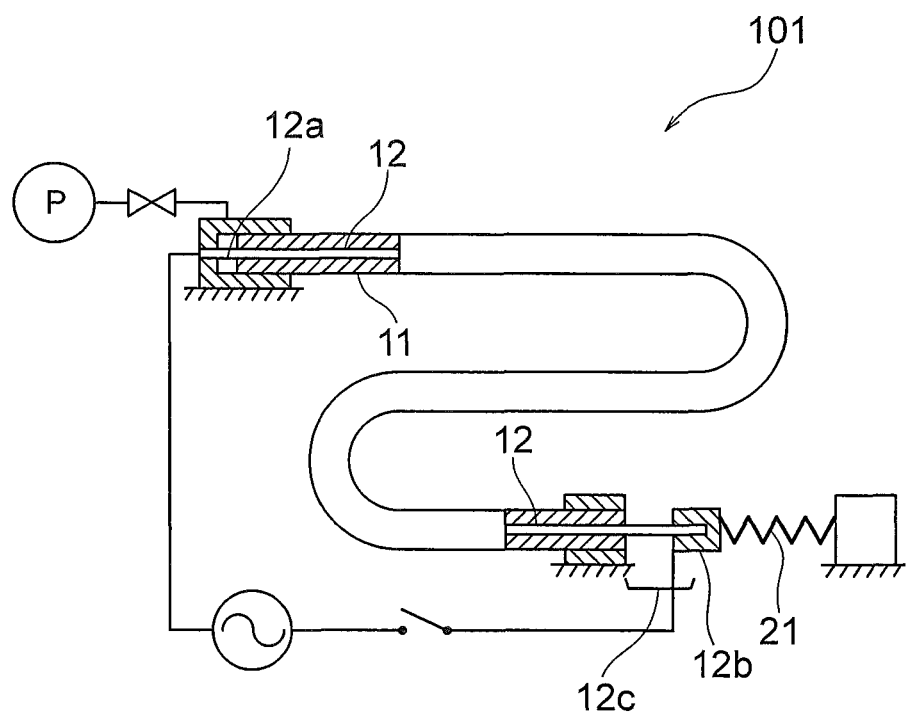
FIG. 3 is a partial cross-sectional view showing an example of a structure of a conventional shape memory alloy actuator.

FIG. 1 is a diagram showing a cross-sectional view of a structure of a shape memory alloy actuator 1 which is the embodiment of the shape memory alloy actuator according to the present invention.

The shape memory alloy actuator 1 includes mainly, a metal wire 7, a shape memory alloy wire 5, a first tube member 11a, a second tube member 11b, a movable body 13, a bias spring 15 which is an elastic member, a fixing member 23, and a joining portion 9 which joins the metal wire 7 and the shape memory alloy wire 5.

Here, the metal wire 7 has a property of having a less deformation in a longitudinal direction.

The joining portion 9 includes a first crimp terminal 9a and a second crimp terminal 9b.

One end of the second tube member 11b and one end of the shape memory alloy wire 5 are fixed to the fixing member 23.

In the embodiment, the bias spring 15 is accommodated inside a tube 20 which is attached to the other end of the first tube member 11.

In the vicinity of the joining portion 9, the first tube member 11a and the second tube member 11b are attached by a hard portion, or in other words a pipe member 17 having an inner diameter larger than an outer diameter of the first tube member 11a and an outer diameter of the second tube member 11b.

It is possible to let the pipe member 17 to be a metal pipe made of a metal such as stainless steel, and the first tube member 11a and the second tube member 11b are let to be flexible (which can bend), and the pipe member 17 cannot be bent (has hardness).

Furthermore, the pipe member 17 protects the joining portion 9, and also has a function as a guide of the joining portion 9, and makes a smooth movement of the movable body 13 possible.

The shape memory alloy wire 5 is connected to one end of the metal wire 7 through the joining portion 9, and a length of the shape memory alloy wire 5 changes by being contracted due to heating by passing an electric current, and by being elongated due to cooling.

Moreover, the shape memory alloy wire 5 is disposed to be capsuled in the second tube member 11b.

The other end of the metal wire 7 is connected to the movable body 13, and with the contraction due to heating by passing an electric current to the shape memory alloy wire 5, the movable body 13 which is connected to the metal wire 7 moves in a direction in which, the length of the shape memory alloy wire 5 changes.

In FIG. 1, a direction of drive (movement) is indicated by an arrow B.

Moreover, the bias spring 15 is disposed to be in contact with the movable body 13. The bias spring 15 generates a force in a direction in which the shape memory alloy wire 5 elongates (leftward direction in FIG. 1), and aids the elongation of the shape memory alloy wire 5 at the time of cooling.

According to such an arrangement, since the shape memory alloy wire 5 is not exposed to the outside environment of the shape memory alloy actuator 1, a temperature controllability of the shape memory alloy wire 5 is improved further, and it is possible to achieve low electric power consumption as the heat does not escape to the outside environment.

Furthermore, since an arrangement is made such that the shape memory alloy wire 5 which is a source of heat generation is at a distance from the movable body 13, it is possible to suppress the heat generated by the shape memory alloy wire 5 from being transmitted to the movable body 13.

Moreover, by letting the first crimp terminal 9a to be a terminal for positioning and the second crimp terminal 9b to have a function of connecting the metal wire 7 and the shape memory alloy wire 5, it is possible to connect by regulating accurately a distance (denoted by A in the diagram) between one end (right side of a paper surface) of the first tube member 11a and one end (left side of the paper surface) of the joining portion 9 more easily.

A method for connecting by regulating the distance will be described by referring to FIG. 2A and FIG. 2B mentioned later.

FIG. 2A and FIG. 2B are diagrams explaining a cross-sectional structure of an example of connecting the shape memory alloy wire 5 and the metal wire 7, for the shape memory alloy wire shown in FIG. 1. Description of an arrangement which is redundant has been omitted, and sites which are not necessary for explanation of connection of the shape memory alloy wire 5 and the metal wire 7 have not been shown in the diagram.

FIG. 2A shows a diagram in which the first crimp terminal 9a has been crimped to the metal wire 7 for the purpose of positioning.

Since the metal wire 7 transmits efficiently the elongation and contraction of the shape memory alloy wire 5 even when the first tube member 11a is bent, it is desirable to use a hard metal wire. Therefore, in the present arrangement, the metal wire 7 is let to be a stainless steel wire.

Copper (such as oxygen-free copper) which is a metal having a hardness smaller as compared to a hardness of stainless steel has been used as a material for the first crimp terminal 9a. Copper being soft, can be crimped without having a need of any large-scale tool or equipment. Consequently, it is possible to crimp the first crimp terminal 9a to the metal wire 7 while regulating the distance A which is a distance between the one end (right side of the paper surface) of the first tube member 11a and one end (left side of the paper surface) of the crimp terminal 9a, to a predetermined distance.

FIG. 2B shows a diagram in which, after the first crimp terminal 9a is crimped, a length of the metal wire 7 which protrudes out from an end portion (right side of the paper surface) of the first crimp terminal 9a, is cut to be shorter than the second crimp terminal 9b, and upon inserting the metal wire 7 and the shape memory alloy wire 5 through the second crimped terminal 9b, an end portion (left side of the paper surface) of the second crimp terminal 9b and the end portion (right side of the paper surface) of the first crimp terminal 9a are crimped in a state of abutting.

The first crimp terminal 9a of an end portion (left side) of the joining portion 9 which has joined the first crimp terminal 9a and the second crimp terminal 9b, being softer than the metal wire 7, although a semipermanent crimped fixing with a stainless steel is not desirable, it has sufficient strength for functioning as a positioning guide, at the time of crimping the second crimp terminal 9b.

Regarding a material for the second crimp terminal 9b, since a metal which has a hardness equivalent to a hardness which imparts sufficient stretch resistance permanently, for fixing the metal wire 7 which is made of stainless steel, is necessary, stainless steel is let to be the material for the second crimp terminal 9b.

The hardness of the second crimp terminal 9b being substantial, although a large-scale tool or equipment is necessary for crimping, since the second crimp terminal 9b is to be crimped upon positioning for the distance A by abutting with the first crimp terminal 9a, it is not necessary to provide a complex mechanism for positioning, and the connection is simplified.

In the present arrangement, a drive area (movement area) of the movable body 13, as shown in FIG. 1, is also restricted by the distance A and a distance between the end portion (right side of the paper surface) of the joining portion 9 and the end portion (left side of the paper surface) of the second tube member 11b.

Consequently, when it is possible to fix upon regulating the distance A accurately, it is possible to make a length of the pipe member 17 which is hard, as short as possible.

As a result, since a portion of the shape memory alloy actuator 1 which cannot be bent becomes short, it is advantageous for using in an environment where bending is necessary.

Moreover, since the distance A also has a function of restricting the distance of the movable body 13, in a case in which, the distance A is small with respect to the drive area of the movable body 13, there is a possibility that the movable body 13 cannot be driven by a predetermined stroke.

Consequently, by fixing by the joining portion 9 upon regulating the distance A to a predetermined distance, it is possible to prevent a manufacturing defect of the shape memory alloy actuator 1.

It is possible to form the first crimp terminal 9a by soldering. By this also, it is possible to regulate the distance A accurately.

The embodiment which has been described above is merely an exemplification for describing the present invention, and it is possible to have various modifications without departing from the scope of the present invention.

INDUSTRIAL APPLICABILITY

As it has been described above, the shape memory alloy actuator according to the present invention is useful as it is capable of expediting further improvement in controllability, and achieving low electric power consumption while realizing a high-quality shape memory alloy actuator having a simple and low-cost structure.

DESCRIPTION OF REFERENCE NUMERALS 1 shape memory alloy actuator
5 shape memory alloy wire
7 metal wire
9 joining portion
9a first crimp terminal
9b second crimp terminal
11a first tube member
11b second tube member
13 movable body
15 bias spring
17 pipe member
20 tube
23 fixing member

What is claimed is:

1. A shape memory alloy actuator comprising:
a wire portion which is inserted through a first tube member;
a shape memory alloy wire portion which is inserted through a second tube member, and which contracts due to heating by passing an electric current, and of which, a length changes by being elongated due to cooling;
a movable body which is movable in a direction in which, the length of the shape memory alloy wire portion changes;
an elastic member which exerts an external force in a direction in which, the shape memory alloy wire portion elongates; and
a fixing member to which, one end of the second tube member and one end of the shape memory alloy wire portion are fixed,
wherein:
one end of the wire portion is connected to the movable body,
one end of the shape memory alloy wire portion and one end of the wire portion are joined by a joining portion,
the joining portion includes a plurality of crimp terminals,
the wire portion transmits an elongation and contraction of the shape memory alloy wire portion, and
the joining portion is inserted through a pipe member having an inner diameter larger than an outer diameter of the first tube member and an outer diameter of the second tube member.

2. A shape memory alloy actuator comprising:
a wire portion which is inserted through a first tube member;
a shape memory alloy wire portion which is inserted through a second tube member, and which contracts due to heating by passing an electric current, and of which, a length changes by being elongated due to cooling;
a movable body which is movable in a direction in which, the length of the shape memory alloy wire portion changes;
an elastic member which exerts an external force in a direction in which, the shape memory alloy wire portion elongates; and
a fixing member to which, one end of the second tube member and one end of the shape memory alloy wire portion are fixed,
wherein:
one end of the wire portion is connected to the movable body,
one end of the shape memory alloy wire portion and one end of the wire portion are joined by a joining portion,
the joining portion includes a plurality of crimp terminals,
the wire portion transmits an elongation and contraction of the shape memory alloy wire portion,
the joining portion has a first crimp terminal and a second crimp terminal, and
the first crimp terminal has a hardness which is smaller as compared to a hardness of the second crimp terminal, and the first crimp terminal crimps only the wire portion.

3. The shape memory alloy actuator according to claim 2, wherein the second crimp terminal crimps the shape memory alloy wire portion and the wire portion.

4. The shape memory alloy actuator according to claim 3, wherein the joining portion is inserted through a pipe member having an inner diameter larger than an outer diameter of the first tube member and an outer diameter of the second tube member.

\* \* \* \* \*